Figure 1:
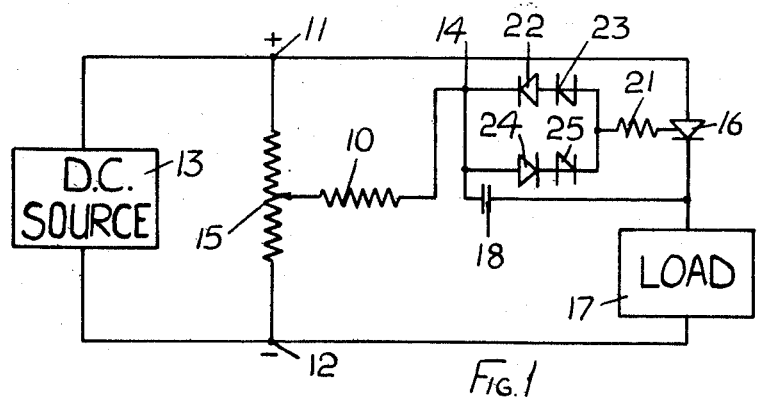

May 18, 1965      M. J. WRIGHT      3,184,665

SEMI-CONDUCTOR DIRECT CURRENT CONTROL CIRCUITS

Filed March 25, 1963

May 18, 1965  M. J. WRIGHT  3,184,665
SEMI-CONDUCTOR DIRECT CURRENT CONTROL CIRCUITS
Filed March 25, 1963  2 Sheets-Sheet 2

United States Patent Office 3,184,665
Patented May 18, 1965

3,184,665
SEMI-CONDUCTOR DIRECT CURRENT CONTROL
CIRCUITS
Maurice James Wright, Harborne, Birmingham, England,
assignor to Joseph Lucas (Industries) Limited, Birmingham, England
Filed Mar. 25, 1963, Ser. No. 267,645
Claims priority, application Great Britain, Mar. 28, 1962,
11,830/62
24 Claims. (Cl. 318—327)

This invention relates to semi-conductor direct current control circuits.

The present invention makes use of the known four layer semi-conductor device termed a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674, filed July 23, 1962. The switchable rectifier has properties which are analogous to those of a previously proposed device termed a transwitch. However, the switchable rectifier should not be confused with the transwitch because there is a very important difference between them. The transwitch is a device which has four layers and can be switched on and off in the same way as the switchable rectifier by pulses applied to its gate, but it is capable of handling only minute currents of the order of milliamps. The switchable rectifier, on the other hand, is, as explained above, a special case of the normal control rectifier which can handle currents of the order of amps, thus, the switchable rectifier can handle a load current of as much as 5 amps without difficulty, and can still be switched on and off at its gate by pulses. A transwitch cannot be operatde in this way.

A circuit in accordance with the invention comprises in combination a switchable rectifier, a load in the anode-cathode circuit of the switchable rectifier, a firing circuit for the switchable rectifier, the firing circuit including a capacitor one side of which is connected to the cathode of the switchable rectifier and the other side of which is connected to the gate of the switchable rectifier through parallel circuits containing respectively a pair of oppositely connected four-layer diodes, means for charging the capacitor to one polarity, means for breaking down one of the four-layer diodes in the forward sense when the capacitor is charged to said one polarity, at which point the capacitor discharges through the gate and cathode of the switchable rectifier to switch the latter on, means for charging the capacitor to the oppose polarity, means for breaking down the other four-layer diode in the forward sense when the capacitor is charged to said opposite polarity, at which point the capacitor discharges through the gate and cathode of the switchable rectifier to switch the latter off, and means for preventing breakdown of either four-layer diode in the reverse direction by the voltage maintained across it by the capacitor.

In the accompanying drawings, FIGURES 1 to 5 respectively are circuit diagrams illustrating five examples of the invention.

The example shown in FIGURE 1 is a free-running pulse generator in which there are provided first and second terminals 11, 12 connected to a D.C. source 13 so as to be of relatively positive and negative polarities in use. There is further provided a third terminal 14 which in use is at a potential intermediate the potentials of the terminals 11, 12. For this purpose, the terminal 14 is conveniently connected through a resistor 10 to a variable point on a resistor 15 interconnecting the terminals 11, 12.

Connected to the terminal 11 is the anode of a switchable rectifier 16 having its cathode connected to the terminal 12 through a load 17. The cathode of the switchable rectifier 16 is connected to the terminal 14 through a capacitor 18 in series with the resistor 10, a point intermediate the capacitor 18 and resistor 10 being connected to one end of a resistor 21 through parallel paths one of which contains a diode 22 and a four-layer diode 23 in series, and the other of which contains a diode 24 and a four layer diode 25 in series the diodes 24, 25 being oppositely connected to the diodes 22, 23 as shown. The other end of the resistor 21 is connected to the gate of the switchable rectifier 16.

In operation, assume that the terminal 11 and the variable point on resistor 15 are at potentials of 200 and 100 volts respectively, the terminal 12 is earthed, and the breakdown voltage of the four-layer diodes 23, 25 is 20 volts. Initially, the capacitor 18 is charged through the resistor 10 and the load 17 until the voltage across it is 20 volts, at which point the four-layer diode 25 breaks down and the capacitor 18 discharges through the gate and cathode of the switchable rectifier and the resistor 21 to render the rectifier 16 conductive. The potential of the cathode of the switchable rectifier now rises to approximately 200 volts, and the capacitor 18 is charged to the opposite polarity until the four-layer diodes 23 breaks down, at which point the capacitor 18 discharges through the resistor 21 and the cathode and gate of the switchable rectifier to switch the latter off. This cycle continues until the supply is removed. The diodes 22, 24 prevent breakdown of the diodes 23, 25 by reverse voltages.

By varying the tapping on resistor 15, the "on" to "off" ratio in each cycle can be varied from a fully on condition, when the potential is between 180 and 200 volts, and a fully off condition when the potential is less than 20 volts.

Figure 2:
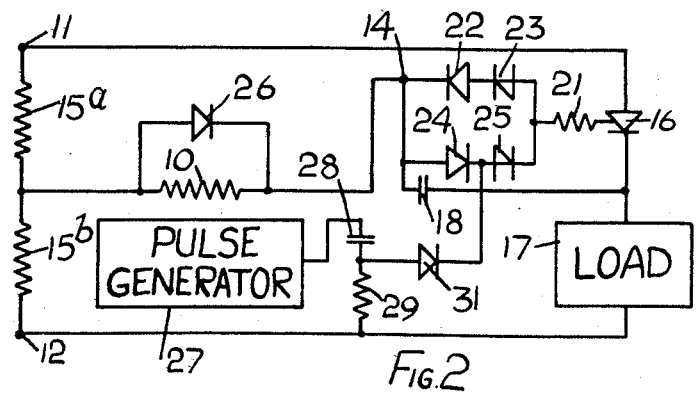

In the modification shown in FIGURE 2, the resistor 10 is bridged by a diode 26, and the resistor 15 is replaced by resistor 15a, 15b such that the potential at the terminal 14 is 20 volts. However, the breakdown voltage of the four-layer diodes 23, 25 is 30 volts. Means is provided for triggering the four-layer diode 25 to switch it on and thereby allow the switchable rectifier to be switched on. This means conveniently comprises a pulse generator 27 connected to the anode of a four-layer diode 25 through a shaping circuit including a capacitor 28, a resistor 29 and a diode 31. Switching off of the switchable rectifier 16 is effected automatically as in FIGURE 1. The diode 26 short-circuits the resistor 10 when the capacitor 18 is being charged through the load 17.

Figure 3:
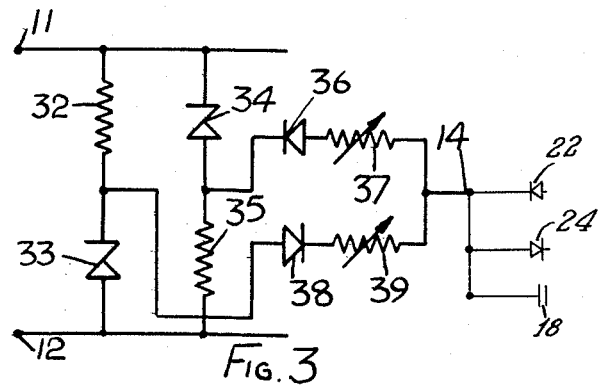

In the modification of FIGURE 1 shown in FIGURE 3, the same circuit is used except that the resistors 10, 15 are omitted and the terminals 11, 12 are interconnected through a resistor 32 and a Zener diode 33 in series, and also through a Zener diode 34 and a resistor 35 in series. A point intermediate the resistor 32 and Zener diode 33 is connected to the terminal 14 through a diode 38 and a variable resistor 39 in series. Moreover, a point intermediate the Zener diode 34 and the resistor 35 is also connected to the terminal 14 through a further diode 36 and a variable resistor 37 in series. The diodes 36, 38 are oppositely connected, and the arrangement is such that the on and off periods of the switchable rectifier 16 can be independently varied by means of the variable resistors 37, 39 which determine the charging rate of the capacitor.

Figure 4:
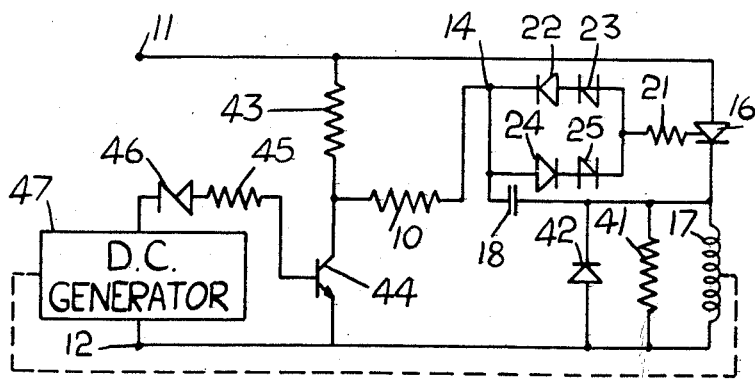

In the example of a motor speed control circuit shown in FIGURE 4, the load 17 is constituted by the armature of a motor, and is bridged by a resistor 41 and a diode 42 in parallel. Moreover, the resistor 15 is replaced by a resistor 43 in series with the collector and emitter of a transistor 44, the base of which is connected to the terminal 12 through a resistor 45 and a Zener diode 46 in series with a D.C. generator 47 operated by the motor.

The arrangement is such that when the transistor 44 is non-conductive, the capacitor 18 is charged until the four-layer diode 25 breaks down, at which point the rectifier 16 is switched on. The capacitor 18 is prevented from charging in the reverse direction by the transistor 44. When the motor speed reaches a predetermined value, the output voltage of the generator 47 reaches the breakdown voltage of the Zener diode 46, and the transistor 44 is rendered conductive. The capacitor 18 now charges through the transistor 44 until the four-layer diode 23 breaks down, at which point the rectifier 16 is switched off. The cycle is then recommenced. The diode 42 provides a path for the back E.M.F. when the rectifier 16 is switched off, and the resistor 41 ensures that when the motor is first energised there is no risk of the current flowing through the rectifier 16 being insufficient to maintain the rectifier 16 on when the gating signal is removed.

The D.C. source in FIGURE 4 could be fully or only partly smoothed A.C. If the source contains a high ripple content it is advantageous to supply this direct to the rectifier 16 and motor, but to smooth the current which is supplied to the resistor 43.

The circuit of FIGURE 4 can also be used as a voltage regulator for a D.C. excited alternator. In this case, the load 17 would be the excitation winding of the alternator, and the output voltage of the alternator, or a proportion thereof, would serve the same purpose as the generator 47. A subsidiary power supply would be required at least for initial excitation.

It will be appreciated that FIGURE 4 illustrates a particular example of a D.C. amplifier in which a low power signal applied to the transistor controls a signal of greater power applied to the load. In FIGURE 4, full energisation of the load is obtained with zero input to the transistor. However, by connecting the transistor with its emitter connected to the terminal 11 and its collector connected to the terminal 12 through the resistor 43, it can be arranged that there is no energisation of the load when the input to the transistor is zero.

Figure 5:
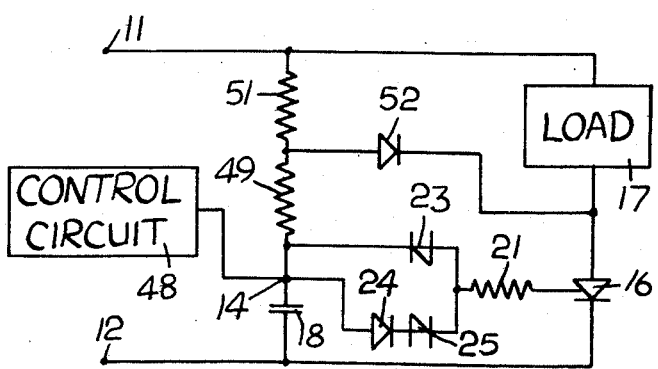

The circuit shown in FIGURE 5 has the load 17 connected in the anode circuit of the rectifier 16 and the terminal 14 connected to a control circuit 48. The terminal 14 is further connected to the terminal 11 through resistors 49, 51, a point intermediate these resistors being connected through a diode 52 to the anode of the rectifier 16.

In operation, the capacitor 18 charges through resistors 51, 49 until the four-layer diode 25 breaks down, at which point the rectifier 16 is switched on. If the control circuit is not operative, the switchable rectifier stays on, but when the circuit 48 operates it maintains the terminal 14 at a more negative potential than the terminal 12, so that the capacitor 18 is charged in the opposite sense until the four-layer diode 23 breaks down and the rectifier 16 is switched off.

Where there is no objection to the capacitor charging current flowing through the load the resistor 51 and diode 52 can be omitted, the resistor 49 being connected between the terminal 14 and the anode of the rectifier 16.

It will be noted that in FIGURE 5 the diode 22 has been omitted. This omission makes no difference to the operation of the circuit, provided that the forward breakdown voltage of the four-layer diode 25 is less than the reverse breakdown voltage of the four-layer diode 23.

The circuit shown in FIGURE 5 could be used for a variety of purposes. For example, the load could be an excitation winding of a dynamo, and the control circuit 48 could be operated automatically by the dynamo at a predetermined output voltage.

Having thus described my invention what I claim as new and desire to secure by Letters Patent is:

1. A semi-conductor direct current control circuit comprising in combination a switchable rectifier, said switchable rectifier having an anode, a cathode and a gate, and being switched on by a positive pulse applied between its gate and cathode, and being switched off by a negative pulse applied between its gate and cathode, a load in the anode-cathode circuit of the switchable rectifier, a firing circuit for the switchable rectifier, the firing circuit including a capacitor one side of which is connected to the cathode of the switchable rectifier and the other side of which is connected to the gate of the switchable rectifier through parallel circuits containing respectively a pair of oppositely connected four-layer diodes, each four-layer diode breaking down when the voltage across it exceeds a predetermined value, and then conducting until the voltage across it falls substantially to zero, means for charging the capacitor to one polarity, means for breaking down one of the four-layer diodes in the forward sense when the capacitor is charged to said one polarity, at which point the capacitor discharges through said one four-layer diode and the gate and cathode of the switchable rectifier to switch the latter on, means for charging the capacitor to the opposite polarity, means for breaking down the other four-layer diode in the forward sense when the capacitor is charged to said opposite polarity, at which point the capacitor discharges through said other four-layer diode and the gate and cathode of the switchable rectifier to switch the latter off, and means for preventing breakdown of either four-layer diode in the reverse direction by the voltage maintained across it by the capacitor.

2. A circuit as claimed in claim 1 including first and second terminals for connection to a D.C. source so as to be of relatively positive and negative polarity in use respectively, the first terminal being connected to the anode of the switchable rectifier and the second terminal being connected to the cathode of the switchable rectifier through the load, a third terminal to which said other side of the capacitor is connected, and means for varying the potential of said third terminal whereby the capacitor charges through the load when the switchable rectifier is non-conductive, and through the switchable rectifier when the latter conducts.

3. A circuit as claimed in claim 2 in which the four-layer diodes are broken down in the forward direction by the voltages developed across the capacitor when the latter is charged in opposite directions respectively.

4. A circuit as claimed in claim 2 in which the voltage to which the capacitor is charged in one direction is sufficient to break down one of the four-layer diodes in the forward direction, but the voltage to which the capacitor is charged in the opposite direction is insufficient to break down the other four layer diode in the forward direction, separate means being provided for this purpose.

5. A circuit as claimed in claim 3 in which a resistor is connected across the first and second terminals, and the third terminal is connected to a point on the resistor, the difference between the potentials of the third and second terminals exceeding the forward breakdown voltage of said one four-layer diode, and the difference between the potentials of the third and first terminals exceeding the breakdown voltage of said other four-layer diode.

6. A circuit as claimed in claim 5 in which said point on the resistor is variable so that the potential at the third terminal can be varied betwene values at which the switchable rectifier is permanently on and values at which the switchable rectifier is permanently off.

7. A circuit as claimed in claim 5 including a resistor through which the capacitor is connected to said point, the resistor limiting the charging current of the capacitor.

8. A circuit as claimed in claim 4 including a pair of resistors through which the third terminal is connected to the first and second terminals, the difference between the potentials of the third and second terminals being less than the forward breakdown voltage of said one four-layer diode, and the difference between the potentials of the third and first terminals exceeding the breakdown voltage of the other four-layer diode, so that the switchable rectifier is switched off by charging of the capacitor in one direction, the circuit further including a pulse generator for supplying pulses to said one four-layer diode to cause it to break down in the forward direction.

9. A circuit as claimed in claim 8 in which said pair of resistors are connected in series between the first and second terminals, and the capacitor is connected to a point intermediate the pair of resistors through a further resistor which limits the charging current of the capacitor.

10. A circuit as claimed in claim 9 in which said further resistor is bridged by a diode which short-circuits the further resistor when the capacitor is being charged through the load, but is non-conductive when the capacitor is being charged through the switchable rectifier.

11. A circuit as claimed in claim 3 including a first Zener diode having its anode connected to the second terminal and its cathode connected to the first terminal through a first resistor, a point intermediate the Zener diode and resistor being connected to the third terminal through the anode and cathode of a first diode in series with a second resistor, and a second Zener diode having its cathode connected to the first terminal and its cathode connected to the second terminal through a third resistor, a point intermediate the second Zener diode and third resistor being connected to the third terminal through the cathode and anode of a second diode in series with a fourth resistor.

12. A circuit as claimed in claim 11 in which the second and fourth resistors are variable.

13. A circuit as claimed in claim 3 including a resistor and a variable resistance device in series bridging the first and second terminals, a point intermediate the resistor and device being connected to the third terminal and the arrangement being such that when the resistance of the device is high the capacitor cannot charge in one direction, to a level sufficient to break down the appropriate four-layer diode.

14. A circuit as claimed in claim 13 including means for controlling said device to vary its resistance, said means being responsive to current flow in the load.

15. A circuit as claimed in claim 14 in which the load is the armature of a motor, and the means for controlling conduction of said device is a D.C. generator operated by the motor.

16. A circuit as claimed in claim 14 in which the load is an excitation winding of an alternator and said means is operated by the alternator output.

17. A circuit as claimed in claim 15 in which said device is a transistor.

18. A circuit as claimed in claim 17 including a Zener diode in the base circuit of the transistor, the transistor being switched on only when the Zener diode breaks down.

19. A circuit as claimed in claim 1, including first and second terminals for connection to a D.C. source so as to be of relatively positive and negative polarity in use respectively, the first terminal being connected through the load to the anode of the switchable rectifier and the second terminal being connected to the cathode of the switchable rectifier, a series circuit connecting said other side of the capacitor to the first terminal whereby in use said capacitor will be charged in one direction through the series circuit until the voltage across the capacitor is sufficient to break down said one four-layer diode, at which point the switchable rectifier is switched on, and means for charging the capacitor in the opposite direction to a voltage sufficient to break down said other four-layer diode so that the switchable rectifier is switched off.

20. A circuit as claimed in claim 19 in which the series circuit includes a resistor connected at one end to said one side of the capacitor and having its other end connected to the first terminal through the load.

21. A circuit as claimed in claim 19 in which the series circuit includes a pair of resistors connected in series between said one side of the capacitor and the first terminal, there being further provided a diode having its anode connected to a point intermediate the pair of resistors and its cathode connected to the first terminal through a load.

22. A circuit as claimed in claim 1 in which said means for preventing breakdown of either four-layer diode in the reverse direction comprises a pair of diodes in series with the four-layer diodes respectively.

23. A circuit as claimed in claim 1 in which one of the four-layer diodes has a forward breakdown voltage which is less than the reverse breakdown voltage of the other four-layer diode, and the means for preventing breakdown of either four-layer diode in the reverse direction comprises a diode connected in series with said one four-layer diode.

24. A circuit as claimed in claim 1 including a resistor in series with the gate of the switchable rectifier for limiting the discharge current of the capacitor.

References Cited by the Examiner

UNITED STATES PATENTS 3,064,174 11/62 Dinger _____ 318—331
3,123,757 3/64 Gaudet _____ 318—327

OTHER REFERENCES

Publication: Static Relays for Electronic Circuits, Engineering Publishers, Elizabeth, New Jersey, 1961, pages 132–134, 138. TK 7872. R 38 B 53 C.3.

ORIS L. RADER, *Primary Examiner.*